Figure 1:
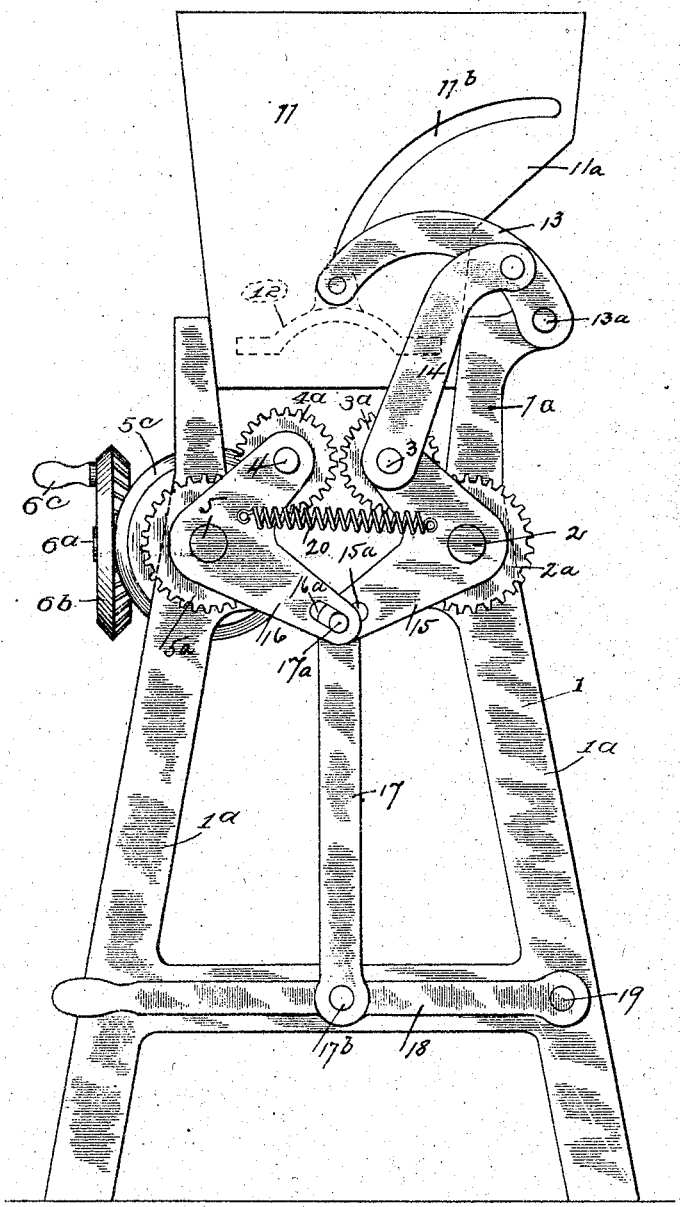

No. 786,879. PATENTED APR. 11, 1905.
C. F. DIETZ.
DOUGH FORMING MACHINE.
APPLICATION FILED FEB. 5, 1904. RENEWED OCT. 3, 1904.

2 SHEETS—SHEET 1.

Witnesses:
John Braunwalder
M. A. Milord

Inventor:
Christian F. Dietz
By Frederick Benjamin
Atty.

No. 786,879. PATENTED APR. 11, 1905.
C. F. DIETZ.
DOUGH FORMING MACHINE.
APPLICATION FILED FEB. 5, 1904. RENEWED OCT. 3, 1904.
2 SHEETS—SHEET 2.
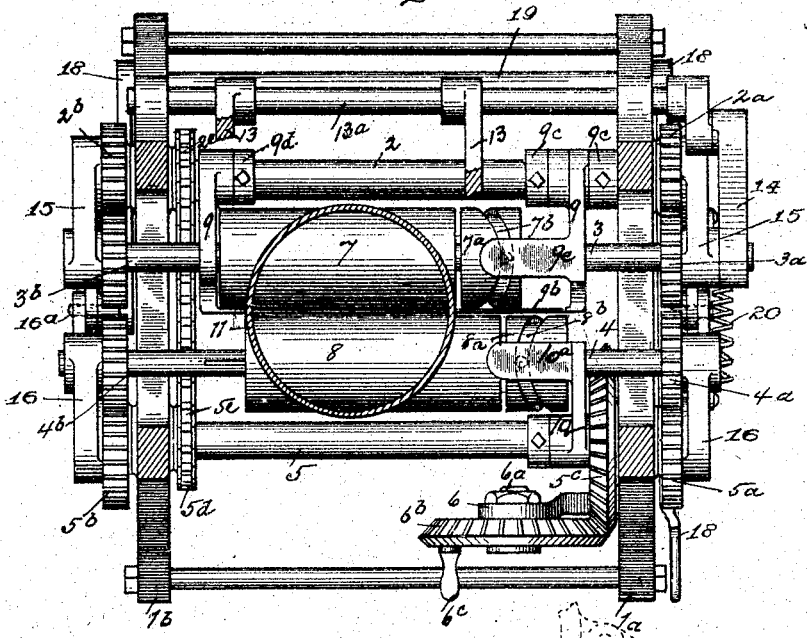
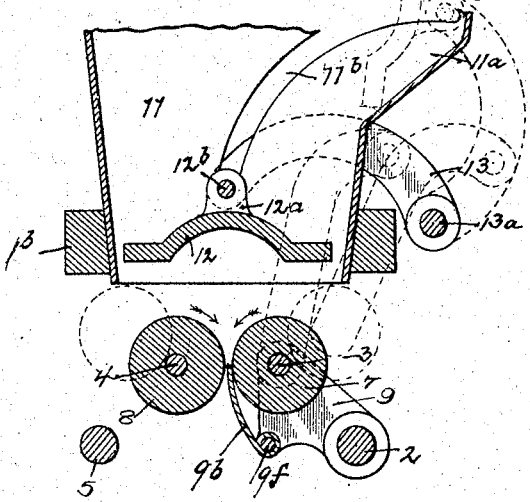
Witnesses:
John Braunwalder
M. A. Milord
Inventor:
Christian F. Dietz
By Frederick Benjamin
Att'y No. 786,879.

Patented April 11, 1905.

UNITED STATES PATENT OFFICE.

CHRISTIAN F. DIETZ, OF CHICAGO, ILLINOIS, ASSIGNOR OF TWO-THIRDS TO AUGUST JUNGE, OF CHICAGO, ILLINOIS, AND PHILLIP F. CARROLL, OF JOLIET, ILLINOIS.

DOUGH-FORMING MACHINE.

SPECIFICATION forming part of Letters Patent No. 786,879, dated April 11, 1905.

Application filed February 5, 1904. Renewed October 3, 1904. Serial No. 226,934.

*To all whom it may concern:*

Be it known that I, CHRISTIAN F. DIETZ, a citizen of the United States, residing at Chicago, in the county of Cook and State of Illinois, have invented certain new and useful Improvements in Dough-Forming Machines, of which the following is a specification.

This invention relates to improvements in that class of bakers' machinery in which dough is formed into loaves either for bread or rolls.

The especial objects of my improvements are to provide a machine in which lumps of dough of irregular shape will be given a spherical or semispherical form by drawing the skin or surface of the dough from the top and sides to a common center on the under side of the lump, thus leaving the sides and top of the finished product smooth or without seams or wrinkles.

By a separate application for patent I have shown a machine for molding lumps of dough into cylindrical and elliptical shapes, and in the present invention I utilize in part some of the principles of said machine, but have added thereto novel means by which while drawing down the skin of the dough from opposite sides of the horizontal axis of the lump I also rotate or partially rotate the lump on its vertical axis, thus effecting a compound movement which results in a spherical formation of the lump of dough. In this machine I provide means for holding the lump of dough in frictional contact with the forming-rollers and also adapt the rollers to be separated, whereby the formed loaf may drop into a pan, traveling belt, or other suitable device for receiving it when the molding operation is complete.

In the accompanying drawings, which form a part of this application, I have shown a preferred embodiment of this invention in the following views:

Figure 1 is a side elevation of the machine complete. Fig. 2 is a top plan view, partly in section. Fig. 3 is a vertical sectional view through a portion of the hopper and through the forming-rollers and scraper.

Referring to the drawings in detail, 1 represents the frame or stand on which the operative elements of my machine are supported and journaled, and it consists of two members $1^a$ $1^b$, suitably formed, connected, and braced to provide a rigid support. Suitably journaled in the members $1^a$ $1^b$ of the frame are shafts 2, 3, 4, and 5. On the opposite ends of the shafts 2 and 5, outside the frame, are pinions $2^a$ $2^b$ and $5^a$ $5^b$, and on the corresponding ends of the shafts 3 4 are pinions $3^a$ $3^b$ and $4^a$ $4^b$. The pinions $4^a$ $4^b$ mesh with and are driven, respectively, by the pinions $5^a$ $5^b$, and the pinions $3^a$ $3^b$ mesh with and are driven, respectively, by the pinions $2^a$ $2^b$. Near one end of the shaft 5 and inside the frame is mounted a bevel-gear $5^c$, which meshes with and is driven by a bevel-pinion $6^b$, mounted on a stud-shaft $6^a$ in the outer end of a bracket 6, which is fixed on the frame member $1^a$ and extends inwardly. The pinion $6^b$ is shown provided with a handle $6^c$, thus serving as a hand-wheel where manual power is used. If mechanical motor-power is utilized, the shaft $6^a$ will be driven from suitable pulleys mounted thereon or in any other convenient manner. Near the end of the shaft 5, opposite the gear $5^c$, a sprocket-wheel $5^d$ is mounted, over which travels a sprocket-chain $5^e$, which also travels over and drives a sprocket-wheel $2^e$ on the corresponding end of the shaft 2, thus transmitting power from the shaft 5 to the shaft 2. The gearing described serves to drive the shafts 3 4 toward each other, as indicated by arrows in Fig. 3.

Slidably splined on the shaft 3 is a roller 7, and similarly mounted on the shaft 4 is a complementary roller 8, the diameter of each roller being such that their faces almost touch. Secured to one end of the roller 7 and correspondingly mounted on the shaft 3 is a collar $7^a$, in the face of which a cam-groove $7^b$ is cut, and the same arrangement is provided on the shaft 4 for the roller 8. Mounted on the shaft 2 near its ends and held against endwise movement by set-collars $9^c$ $9^d$ are arms 9 9, through the free ends of which the shaft 3 extends. One of these arms is formed with a horizontal extension, as $9^e$, which extends over the collar $7^a$, and from the free end of which extends downwardly a pin (shown by dotted lines) which fits loosely the cam-groove in said collar. The same arrangement is provided on the shaft 4 in the arm 10 and extension $10^a$.

Mounted on a shaft $9^f$, the ends of which are fixed in the arms 9, is a blade $9^b$, which projects upwardly and has its edge occupying the space between the rollers 7 8, thus serving to scrape from said rollers any dough that might stick to same and also preventing the dough from being drawn down between said rollers.

Suitably supported on extensions $1^b$ of the frame is an open hopper 11, the discharge end of which is directly over the rollers 7 8. The hopper is formed with a recess $11^a$ in its rear wall, and in its side walls are cut curved slots $11^b$ $11^b$. Arranged in the hopper is an arched plate 12, on the upper side of which are perforated lugs $12^a$, which receive pins $12^b$, that extend through the slots $11^b$ and serve to loosely connect the plate with supporting-arms 13, arranged at the sides of the hopper. These arms are pivoted on a shaft $13^a$, which extends across the rear of the frame. Link 14 is pivotally connected at its upper end to one of the arms 13, and the lower end of this link is likewise connected with the upper arm of the two-arm lever 15, which is pivotally connected with the shaft 3 and mounted on the shaft 2. The lower arm of the lever 15 is slotted, as at $15^a$, to slidingly receive a pin $17^a$, fixed in the upper end of the vertical rod 17, the lower end of which is pivoted at $17^b$ to the horizontal lever 18, which is in turn pivoted on a shaft 19, which extends across the frame and has bearings in same.

On one end of the shaft 5 a second two-arm lever 16 is mounted, in the upper arm of which the shaft 4 is journaled. In the lower arm of said lever is a slot $16^a$, in which the pin $17^a$ works. A spiral spring 20 connects the upper arms of the two levers 15 16, the tension of said spring being exerted to draw the said upper arms of the levers toward each other.

From the construction above described it will be seen that by lifting the free end of the lever 18 the lower arms of the levers 15 and 16 will be raised and the upper arms will be thrown outwardly against the tension of the spring 20, whereby the rollers, the shafts 3 and 4 of which are journaled in the upper arms, will be separated, and thus permit the dough on the rollers to drop by gravity into any suitable receptacle that may be placed below said rollers. The same movement of the levers 15 16 will, through the link 14 and lever 13, raise the plate 12 and throw it into the recessed portion of the hopper, thus leaving an unobstructed passage to the rollers, so that another mass of dough may be thrown onto the rollers to be formed into a loaf.

Upon the driving of the wheel or bevel-gear $6^b$ the rollers 7 8 will be rotated toward each other, thus drawing downwardly and inwardly the skin or outer-surface dough of the mass placed on the rollers, and thereby tending to give a cylindrical form to the dough around a horizontal axis, and the reciprocating movement of the rollers on their respective shafts caused by the pins in the arms $9^e$ $10^a$ working in the cam-grooves $7^b$ $8^b$ also acts on opposite sides of the dough and tends to rotate same on a vertical axis, thus resulting in producing a loaf in substantially spherical form.

The function of the plate 12 is to hold by its weight the dough in sufficiently close frictional contact with the rollers to secure the most effective gripping of the skin or outer surface of the dough.

It will be apparent that various changes may be made in the details of my machine without departure from the principles thereof. Hence I do not wish to be limited to the precise construction and combination of elements shown; but

What I claim, and desire to obtain by Letters Patent, is—

1. In a dough-forming machine, rollers adapted to support a lump of dough and mounted to rotate toward each other and also mounted to slide in opposite parallel planes.

2. In a dough-forming machine, contiguously-placed rollers adapted to support a lump of dough, mounted to rotate toward each other, and also adapted to reciprocate in opposite directions substantially in the manner set forth.

3. In a dough-forming machine, rollers adapted to support a lump of dough and mounted to rotate toward each other, also adapted to slide in opposite parallel planes, and means for raising said rollers to permit the lump of dough to drop by gravity.

4. In a dough-forming machine, rollers adapted to support a lump of dough and mounted to rotate toward each other and to slide in parallel planes, means for separating said rollers and means for restoring them to their normal position.

5. In a dough-forming machine, rollers adapted to support a lump of dough and mounted to slide in parallel planes, a plate arranged above said rollers and adapted to hold the dough in contact with the rollers, and means for operating said plate.

6. In a dough-forming machine rollers adapted to support a lump of dough and mounted to slide in parallel planes, pivoted levers supporting the journals of said rollers, means for operating said levers to spread apart said journals and means for automatically restoring the levers to their normal positions.

In testimony whereof I affix my signature in presence of two witnesses.

CHRISTIAN F. DIETZ.

Witnesses:
 WM. B. MOORE,
 F. BENJAMIN.